United States Patent
Hartke et al.

(10) Patent No.: US 6,422,255 B1
(45) Date of Patent: Jul. 23, 2002

(54) MULTI-FUNCTION VALVE HAVING A MOVABLE SEAT AND NEEDLE

(75) Inventors: David J. Hartke, Gurnee; Richard P. Kolb, Prairieview, both of IL (US)

(73) Assignee: Bombardier Motor Corporation of America, Grant, FL (US)

( * ) Notice: Subject to any disclaimer, the term of this patent is extended or adjusted under 35 U.S.C. 154(b) by 0 days.

(21) Appl. No.: 09/631,420

(22) Filed: Aug. 3, 2000

(51) Int. Cl.$^7$ ............................................... F16K 24/04
(52) U.S. Cl. .................... 137/12; 123/516; 137/198; 137/202
(58) Field of Search .................. 137/14, 198, 202, 137/12; 123/516

(56) References Cited

U.S. PATENT DOCUMENTS

| | | | | |
|---|---|---|---|---|
| 1,710,848 A | * | 4/1929 | Turek | 137/202 |
| 2,677,939 A | * | 5/1954 | Clute | 137/202 X |
| 4,951,701 A | * | 8/1990 | Boehmer | 137/202 X |
| 5,004,002 A | * | 4/1991 | Kobayashi | 137/202 X |
| 5,019,141 A | * | 5/1991 | Granville et al. | 137/202 X |
| 5,255,702 A | * | 10/1993 | Journee et al. | 137/202 |
| 5,386,843 A | * | 2/1995 | Church | 137/202 |
| 5,402,818 A | * | 4/1995 | Kasugai et al. | 137/198 |
| 5,623,910 A | | 4/1997 | Riggle | 123/510 |
| 5,738,333 A | | 4/1998 | Cognevich et al. | 251/61.2 |
| 6,012,434 A | | 1/2000 | Hartke et al. | 123/516 |

* cited by examiner

Primary Examiner—Gerald A. Michalsky
(74) Attorney, Agent, or Firm—Timothy J. Ziolkowski; Cook & Franke SC

(57) ABSTRACT

A multi-function pressure relief valve having a moveable seat and a needle is mounted on a fuel vapor separator. The needle is connected to a float assembly for opening and closing the pressure relief valve for venting an internal chamber of the fuel vapor separator. The moveable seat is biased to engage the needle for relieving excess pressure when vapor pressure in the internal chamber exceeds a biasing force on the movable seat. The valve opens in response to at least one of (1) changing fluid level in the fuel vapor separator, and (2) excess vapor pressure within the vapor fuel separator. During operation, the valve vents an internal chamber of the fuel vapor separator by disengaging the needle from the movable seat using a float attached to the needle. The valve closes when the float reaches a desired position to pressurize the internal chamber by engaging the needle to the movable seat. The valve also releases excess vapor pressure in the internal chamber when the pressure in the internal chamber exceeds a biasing force on the movable seat and disengages the movable seat from the needle.

25 Claims, 4 Drawing Sheets

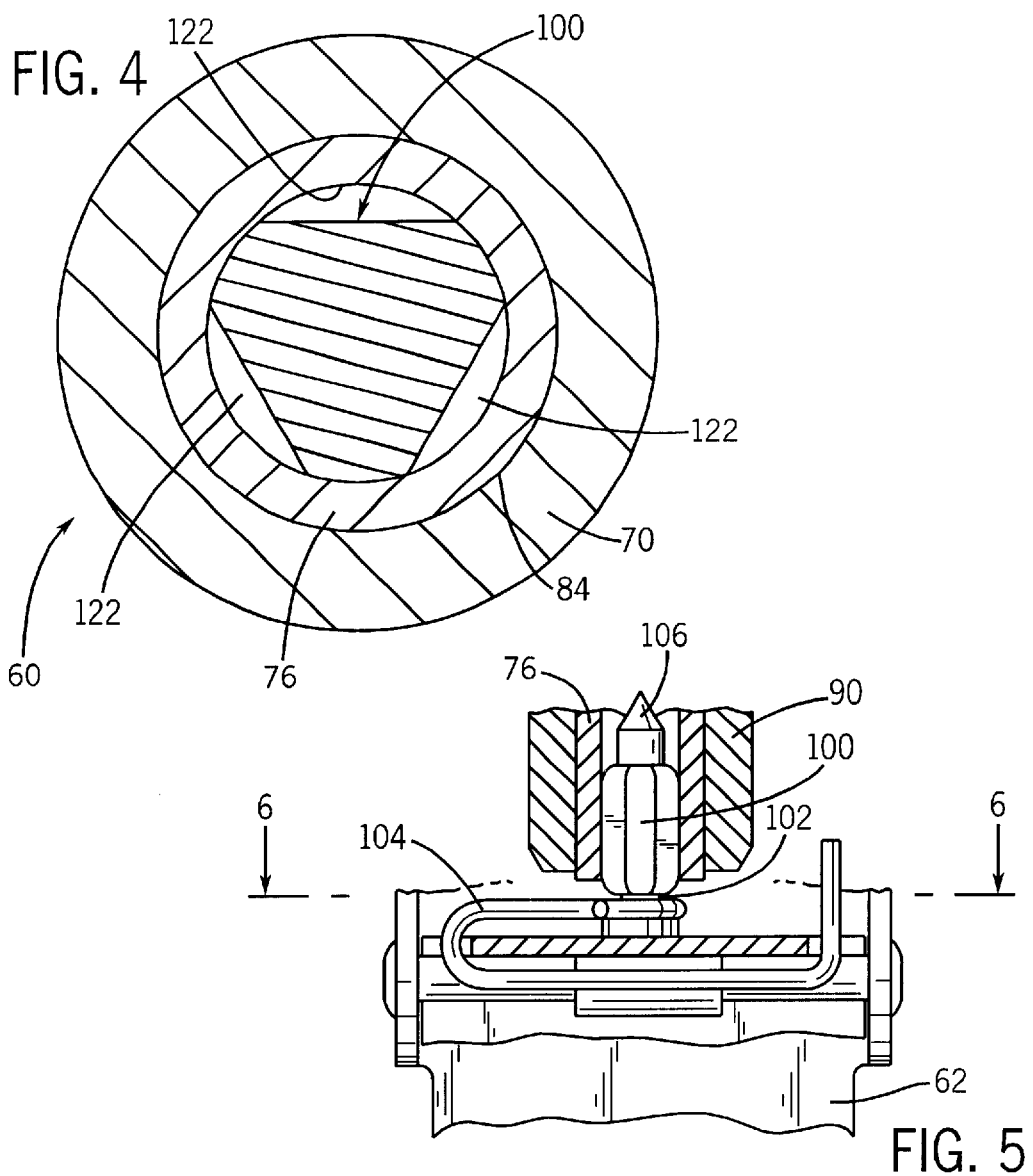
FIG. 4
FIG. 5
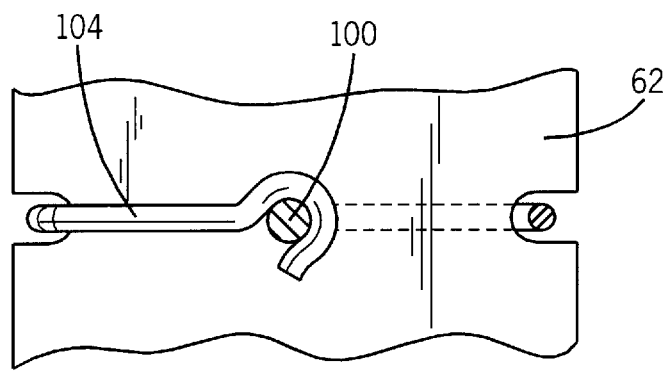
FIG. 6

MULTI-FUNCTION VALVE HAVING A MOVABLE SEAT AND NEEDLE

BACKGROUND OF THE INVENTION

The present invention relates generally to a pressure relief valve and, more particularly, to a multi-function pressure relief valve having a moveable seat and a movable needle to both vent and release excess pressure in a fuel vapor separator.

Pressure relief valves are designed to protect a pressurized system against excessively high or low pressure in the event of positive or negative excursion of the system pressure. They are required to open at a predetermined system pressure, to discharge or admit air or another fluid so as to prevent the system pressure from exceeding a specified upper or lower pressure limit, and to automatically reclose after a normal system pressure has been restored. These pressure relief valves have numerous applications in process, petrochemical, and automotive industries.

Vapor release valves are designed to allow a vessel to become filled by a fluid by venting air or another vapor out of a vessel that is displaced by the incoming fluid. Nearly every vessel that stores a fluid must have some type of venting arrangement to allow the fluid to enter the vessel without being restricted by vapor within the vessel. The venting system operates to expel the vapor as the fluid enters the vessel. Some of these systems are not required to be pressurized. The venting arrangement for some of these unpressurized systems can be as simple as an open vent line located on the top of the vessel. Other unpressurized systems may have a check valve in the vent line to prevent return vapor flow into the vessels, and still other systems may have a vapor recovery system to return the fluid vapors back to the vessel while expelling vapor. Still other systems are pressurized and must incorporate measures to expel air via a venting system that allows the vessel to become pressurized after venting. Vapor release valves used in pressurized systems typically include a needle and seat arrangement wherein the needle is operated by a float assembly and engages and disengages a stationary seat at the top of the vessel. When the vessel is empty, or the fluid level in the vessel is low, the float pulls the needle into an open position to allow venting. As the fluid fills the vessel, the float moves upward and closes the needle against the seat when the vessel is full as dictated by the float level.

One application for pressure relief valves and/or vapor release valves is in fuel vapor separators. Fuel vapor separators are often used in fuel delivery systems of internal combustion engines to remove entrained vapor from fuel. Heat build up in an engine can adversely affect the engine's fuel delivery system by causing the fuel to become vaporized before it is introduced into the engine's combustion chamber. The vaporized fuel interferes with proper engine combustion and, consequently, with engine power and performance. Pressure vessels, such as fuel vapor separators, are known for reducing or eliminating vaporized fuel in the fuel delivery system. The fuel vapor separator includes a housing where fuel is passed through and in which vapor is allowed to separate from the liquid fuel. During filling of the system, the vapor from the fuel is vented from the separator through a vapor release valve, which is usually of the movable needle and stationary seat type that is operated by a float assembly as previously described. After venting is complete, the vapor release valve closes upon consequent filling of the separator with liquid fuel.

Some fuel vapor separators may incorporate a separate pressure relief valve to exhaust excess pressure from the systems after the separator is pressurized. The need for pressure relief valves in fuel vapor separators is especially evident in outboard marine engines. Most fuel vapor separators have coolant passages to maintain the fuel temperature in the fuel delivery system at an acceptably low value. Unlike most internal combustion engines that have closed coolant systems, outboard marine engines instead utilize the benefit of fresh water supplied by the lake or other waterway in which they are used to cool the engine. The water is continually circulated past the fuel vapor separator to cool the fuel in the separator. However, a problem can arise with this type of arrangement when the engine shuts down. The typical fuel vapor separator is mounted on or near the engine to maintain a consistent fuel temperature which increases engine performance and economy. Once the engine is shut down, the coolant water drains from the engine and the fuel separator. Under certain conditions, as the water is draining from the separator after the engine is shut down, the water can heat up rapidly and vaporize due to the fact that the engine is still hot and the water is no longer circulating through the system. This can cause the fuel inside the fuel vapor separator to also heat up and expand. Although fuel vapor separators are designed to withstand a certain pressure differential, as with any design, there are always limits. Accordingly, a pressure release valve may be placed in the separator to accommodate extreme conditions where the temperature differential between the water and engine exceed the design parameters and create a pressure differential in the separator that exceeds the design parameters. Such a pressure release valve can then expel vapor and/or fuel from the separator until the pressure and temperature differentials are normal. The use of both a vapor release valve and a pressure relief valve in the same system significantly adds to the cost and complexity of the system.

In view of the aforementioned, it would be desirable to design a single multi-function valve that allows both vapor to vent from a fuel vapor separator or other system in response to changing fluid levels as well as excess pressure to be relieved within the system.

SUMMARY OF THE INVENTION

The present invention solves the aforementioned problems by providing a multi-function valve that has a movable seat and a movable needle, each providing a separate function. Specifically, multi-function valve opens and closes in response to both (1) changing fluid level in a fuel vapor separator or other pressurizable system, and (2) excess vapor pressure within the vapor fuel separator.

The valve has a valve body with an inlet port and an outlet port. A movable needle is disposed in the inlet port of the valve body and is controlled by a float attached to the needle. The float moves the needle between (1) an open, venting position when the float is in a lowered position in response to low fluid levels in the chamber caused by the presence of air or fuel vapor in the chamber, and (2) a closed position when the float is in a raised position in response to elevated fluid levels in the chamber. The multi-function valve also includes a movable seat located in the outlet port of the valve body. The movable seat is biased to a closed position in which it contacts the needle and is responsive to excess pressure in the chamber to an open, pressure relief position which disengages the seat from the needle and allows pressure relief from the internal chamber. In one embodiment, the multi-function valve is used in a fuel separator of an outboard marine engine.

Other various features, objects and advantages of the present invention will be made apparent from the following detailed description and the drawings.

BRIEF DESCRIPTION OF THE DRAWINGS

The drawings illustrate a preferred embodiment of the invention.

In the drawings:

FIG. 4 is a cross-sectional plan view of a portion of the multi-function valve taken along line 4—4 of FIG. 2.

FIG. 5 is a sectional, elevation view taken along line 5—5 of FIG. 2.

FIG. 6 is a sectional view taken along line 6—6 of FIG. 5.

DETAILED DESCRIPTION OF THE PREFERRED EMBODIMENT

Figure 1:
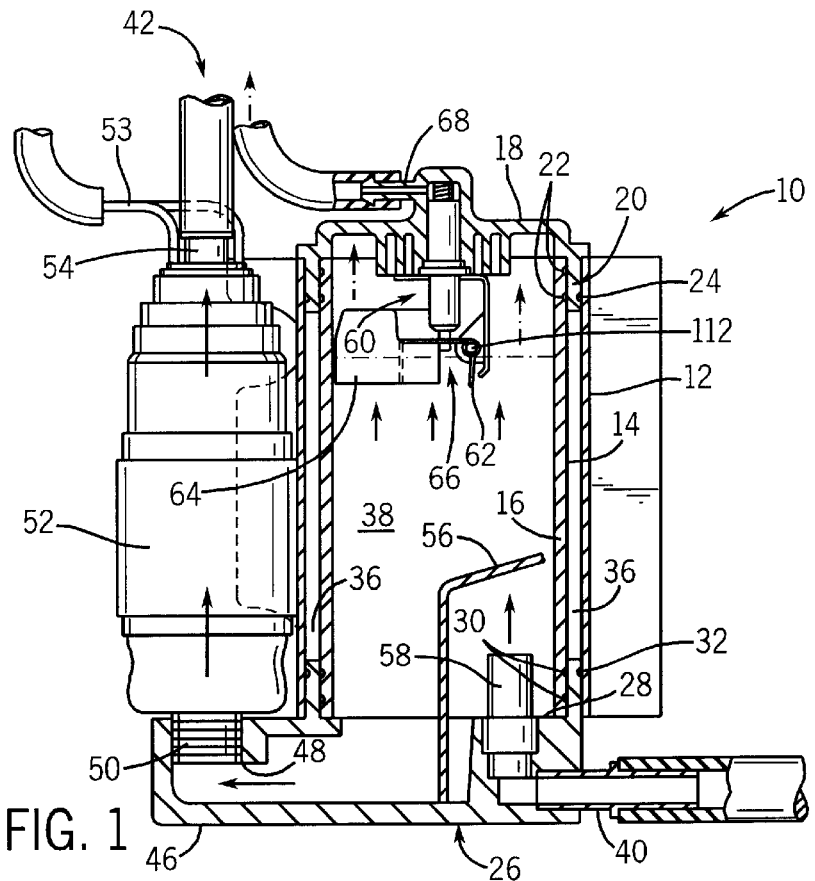
FIG. 1 is a partial sectional view of a fuel vapor separator incorporating the present invention.

FIG. 1 shows a portion of a fuel delivery system including a fuel vapor separator 10 constructed in accordance with the invention. Fuel vapor separator 10 includes as an outer housing 12 forming an outer reservoir as will be described hereinafter. The housing 12 preferably is formed by extrusion techniques and made of a suitable aluminum composition. Housing 12 is formed to define a generally cylindrical internal wall 14. Within the housing 12 is a sleeve-like inner housing 16 forming an inner reservoir that is similarly composed of an aluminum composition. An upper cover 18 has an annular wall 20 that is sealed to the inner housing 16 by a pair of radial seals 22 or O-rings. The wall 20 is also sealed to the outer housing 12 with a radial seal 24. The assembly 10 also includes a lower cover 26 having an annular wall 28 that is sealed to the bottom of the inner housing 16 by a pair of radial seals 30 and to the bottom of the outer housing by a radial seal 32.

The assembly of the two housings 12 and 16 is configured such that the inner housing 16 is spaced from the outer housing 12 sufficiently to form an outer annular reservoir or coolant jacket 36 through which water is circulated under pressure from the engine's water cooling pump (not shown). Typical water pressure in the reservoir is on the order of 40 psi. The inner housing 16 defines a cylindrical fuel chamber 38 into which fuel is introduced through a main inlet nipple 40 and discharged through a main outlet 42. The fuel within the fuel chamber 38 is therefore cooled by circulating water.

The lower cover 26 includes a laterally extending housing portion 46 having an internal passage 48 that is configured to receive a nipple 50 of an electric fuel pump 52. The fuel pump 52 is controlled electrically via power leads 53 and has an upper nipple 54 associated with the main outlet 42. Thus, fuel is pumped through the fuel chamber 38 from the inlet nipple 40 to the outlet nipple 54 and out the main outlet 42. A baffle 56 is preferably provided within the middle of the fuel chamber 38 to assist circulate the fuel and thus enhance the cooling effect of the water passing through the reservoir 36. The assembly also includes a check valve assembly and a filter in passage 58.

Figure 2:
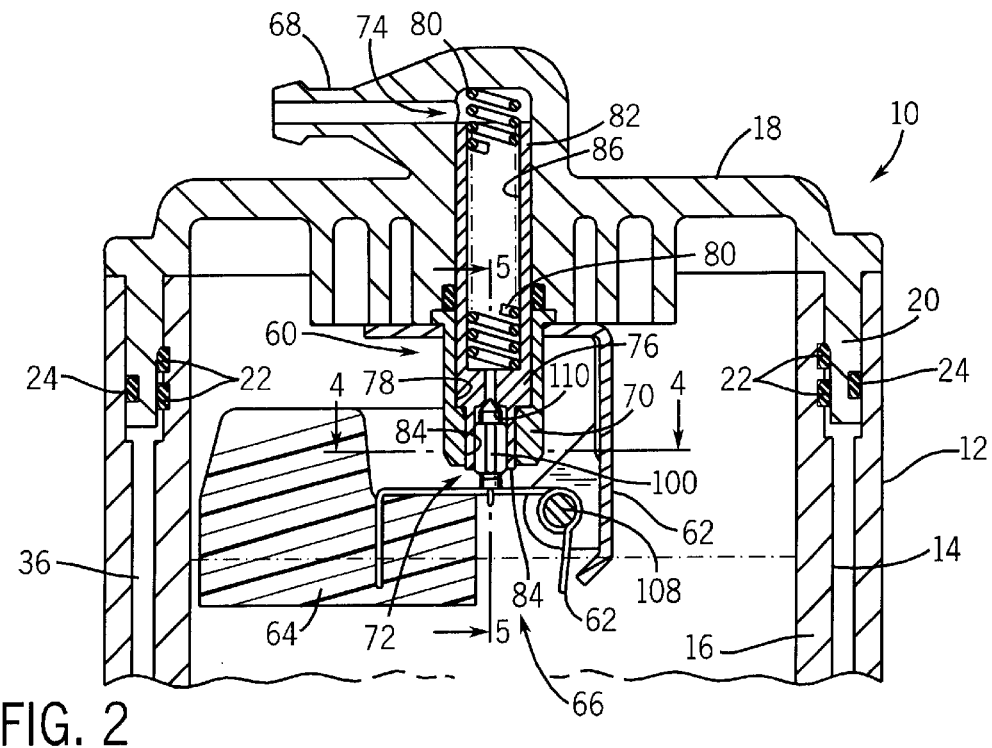
FIG. 2 is an enlarged view of a portion of FIG. 1 that includes a multi-function valve constructed in accordance with the present invention.

In accordance with the present invention, the upper cover 18 includes a single multi-function valve 60 (hereinafter "valve") used for venting air and fuel vapor from the chamber 38, and relieving pressure from the fuel chamber 38. FIG. 2 shows valve 60 having a valve body 70 with an inlet port 72 and an outlet port 74. The valve 60 has two open positions and operates either in response to the changing fluid level in the fuel vapor separator 10 or in response to excess vapor pressure within the vapor fuel separator 10. In a first open position, an open venting position, the valve 60 opens in response to a low fluid level based on the position of a float 64. When air or fuel vapor accumulates within the fuel chamber 38 to the point that liquid levels in the chamber 38 decline, the float 64 drops, and the valve 60 opens to vent vapor out of the cover 18 through a nipple 68. In a second open position, an open pressure relief position, the valve 60 opens when pressure in the internal chamber 38 of the fuel vapor separator 10 exceeds a biasing force on a movable seat 76. When valve 60 opens, pressure is released to lower the pressure in the fuel chamber 38 below a level at which the opening forces imposed on the valve by the pressure chamber 38 are overcome by the biasing force.

Figure 3:
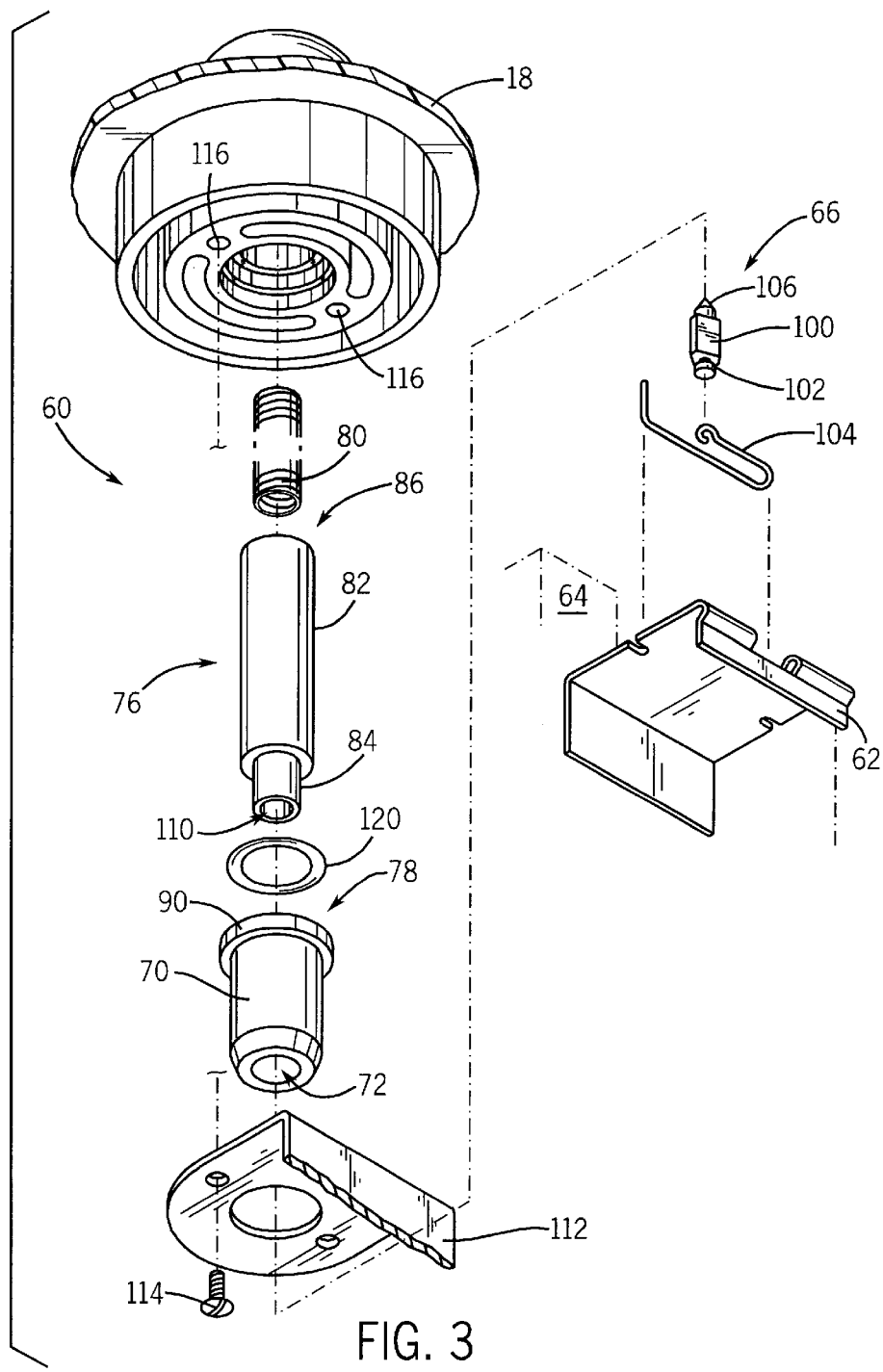
FIG. 3 is an exploded perspective view of the portion of FIG. 1 illustrated in FIG. 2.

FIG. 3 shows an exploded view of the major components of the valve 60 including a valve body 70, the movable seat 76, and the needle 100. The valve body 70 has a shoulder 90 that is generally cylindrical and that provides a stop for the valve body when it is positioned in a mounting bracket 112. A sealing ring 120 is positioned between the movable seat 76 and the valve body 70 to prevent leakage past the valve 60. Mounting bracket 112 is supported on the upper cover 18 by mounting screws 114 threadedly engaged to threaded passages 116 of the upper cover 118. An interior space 78 is formed in the valve body 70 to accept the movable seat 76 slidably therein. The movable seat 76 includes an upper portion 82 and a lower portion 84. As best viewed in FIG. 2 and 7–9, the lower portion 84 of the movable seat 76 has a frusto-conical seat surface 110, which allows the movable needle 100 and the movable seat 76 to close air and fluid flow when the valve 60 is in the closed position. A spring 80 is positioned in an inner bore 86 of the upper portion 82 of the movable seat 76 to bias the movable seat 76 against the shoulder 90 of the valve body 70. Excess pressure can then be relieved in the internal fuel chamber 38 when pressure therein exceeds the biasing force imposed on the movable seat by the spring 80.

Referring again to FIG. 3, the needle 100 has a slot 102 attachable to a needle spring clip 104 that pivots about bracket 62. A tip 106 of the needle 100 is disposed in the inlet port 72 of the valve body 70. The needle 100 is connected to the float 64 through a needle spring clip 104. The float 64 is connected to a stationary pin 108, FIG. 2, through bracket 62, to allow the needle 100 to move into and out of engagement with the movable seat 76.

FIG. 4 shows a cross-section of the movable needle 100. The movable needle 100 has a semi-triangular cross-section, which allows vapor flow through a plurality of flow paths 122 in the lower portion 84 of the movable seat 76. Vapor is allowed to pass through flow path 122 when the needle 100 is moved downwardly within the movable seat 76. Conversely, pressure is relieved through paths 122 when the movable seat 76 moves upwardly away from the needle 100.

FIG. 5 shows an enlarged elevational view of a section of the valve 60. The movable needle 100 is positioned in the movable seat 76, which in turn is positioned in the valve body 70. The bottom slot 102 of the movable needle 100 is hinged to the needle spring clip 104 and is supported by the float support bracket 62. FIG. 6 shows the needle spring clip 104 clipped to the bottom of the needle 100 and retained to the bottom of the float support bracket 62.

Figure 7:
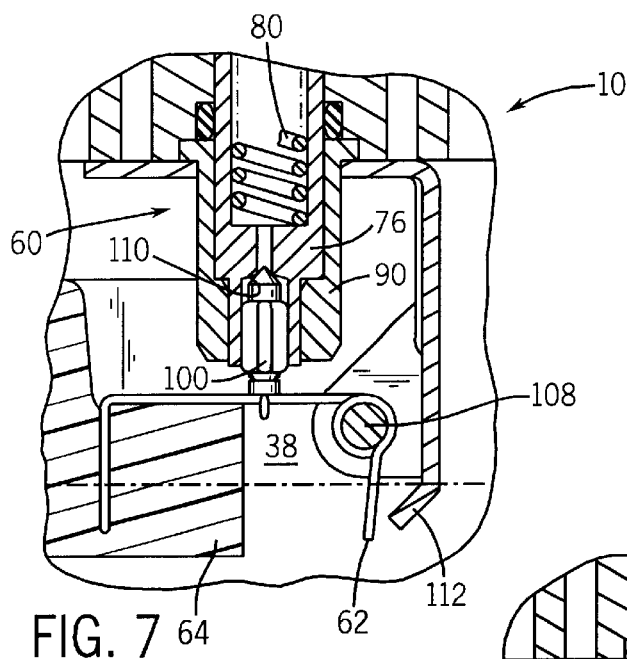
FIG. 7 is an enlarged fragment of FIG. 1 showing a portion of a float and the multi-function valve in a closed position.

FIG. 7 shows a portion of the float 64 and the valve 60. The valve 60 is shown in the closed position in the fuel vapor separator 10. The valve 60 assumes this position when the fuel vapor separator 10 is filled with fuel at a maximum fill level and there is no excess vapor pressure within the internal fuel chamber 38. The float 64 is in its raised position, and the valve 60 is closed. The float 64 is connected to the pin 108 through the float support bracket 62. The float 64 causes the float support bracket 62 to pivot in the clockwise direction so that the needle 100 is in engagement with the moveable seat 76 to place the valve 60 in its closed position.

Figure 8:
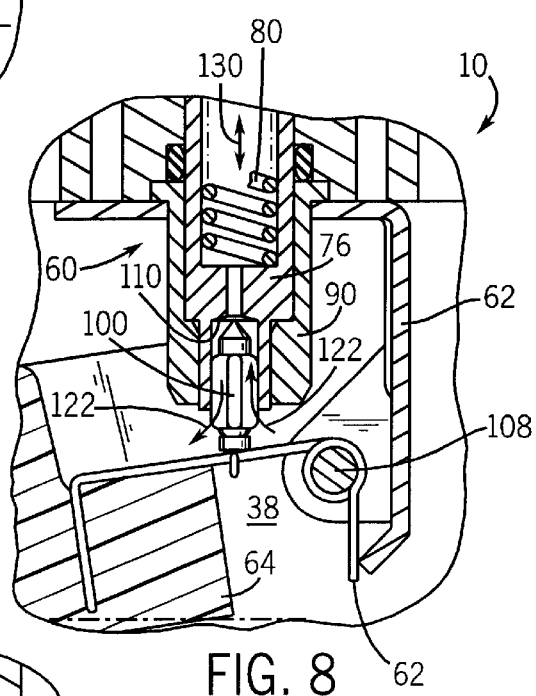
FIG. 8 is an enlarged fragment of FIG. 1, similar to FIG. 7, showing the multi-function valve in an open venting position.

FIG. 8 shows the valve 60 in the open venting position. When the internal fuel chamber 38 is empty or has a low fluid level, the float 64 is in its lowered position. The float 64, being attached to the needle 100 through the float support bracket 62, causes the needle 100 to disengage from the moveable seat 76 and open the flow paths 122 when the float is in its lowered position. Therefore, vapor and/or air is allowed free movement along passage 130 and out of the valve 60.

Figure 9:
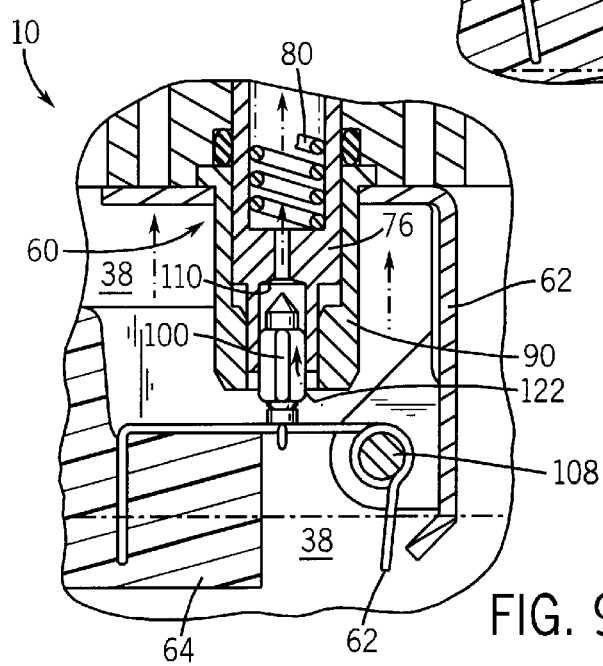
FIG. 9 is an enlarged fragment of FIG. 1, similar to FIGS. 7 and 8, showing the multi-function valve in an open pressure relief position.

FIG. 9 shows the valve 60 in an open pressure relief position. When the fuel vapor separator 10 is filled with fuel at a maximum fill level and the float 64 is in its raised position, the valve 60 will open if there is excess pressure within the internal fuel chamber 38 and release excess pressure in the internal fuel chamber 38 through flow paths 122. That is, when the lifting force on the movable seat generated by pressure in the internal fuel chamber 38 exceeds the biasing force of the spring 80 on the movable seat 76, the movable seat 76 disengages from the movable needle 100 until the lifting force generated by the pressure in chamber 38 falls below the biasing force of spring 80.

Based on the forgoing, and referring again to FIGS. 7–8, valve 60 moves between its closed and the open positions in response to changing fuel level in the fuel vapor separator 10. As shown in FIG. 7, when the fuel vapor separator 10 is filled with fuel at a maximum fill level, the float 64 is ascended beyond the position depicted in FIG. 8 to pivot the float support bracket 62 in the clockwise direction to lift the movable needle 100 into engagement with the moveable seat 76 to close, the valve 60. Gravitational force causes the valve 60 to open as the float 64 descends from its maximum fill level position. Therefore, the movable needle 100, which is attached to the float 64, is disengaged from the moveable seat 76, which allows vapor to be vented out from the valve 60.

The present invention has been described in terms of the preferred embodiment, and it is recognized that equivalents, alternatives, and modifications, aside from those expressly stated, are possible and within the scope of the appending claims.

What is claimed is:

1. A pressure relief valve assembly comprising:
   (A) a valve body having an inlet port, an outlet port, and a shoulder extending inwardly within the valve body;
   (B) a movable seat having a length longer than that of the valve body and which is at least partially disposed in and movable in the valve body, the movable seat having a shoulder separating an upper portion from a lower portion which engages against the shoulder of the valve body to define a lower stop for the movable seat; and
   (C) a movable needle movably disposed in the movable seat, the movable seat and the movable needle selectively engaging with and disengaging from one another within the valve body.

2. The pressure relief valve assembly of claim 1 wherein the needle is movable between a vent position and a closed position.

3. The pressure relief valve assembly of claim 1 wherein the movable seat is movable between a vent position and a closed position, and wherein the needle is engaged with the movable seat in a pressure relief valve position.

4. The pressure relief valve assembly of claim 1 wherein the valve body is mounted in a fuel vapor separator.

5. The pressure relief valve assembly of claim 1 wherein the movable needle further includes a needle spring clip, and wherein the needle spring clip is connected to a float through an upwardly extending float arm.

6. The pressure relief valve assembly of claim 1 wherein the moveable seat has a seat surface on an inside of the lower portion.

7. The pressure relief valve assembly of claim 1 wherein the moveable seat is coaxially aligned with the valve body and is slidably disposed in an interior space of the valve body and is biased toward a closed position there by a spring located inside the upper portion of the movable seat.

8. The pressure relief valve assembly of claim 1 wherein the moveable seat further comprises a first inner bore passage located in the upper portion configured to receive a spring therein and a second inner bore passage located in the lower portion wherein the movable needle is slidably engagable with seat surface of the movable seat.

9. The pressure relief valve assembly of claim 8 further comprising a third inner bore passage in the movable seat that connects the first inner bore passage and the second inner bore passage to one another.

10. The pressure relief valve assembly of claim 1 wherein the movable seat includes a frusto conical seat surface engagable with the movable needle.

11. The pressure relief valve assembly of claim 1 further including an end cap, a spring, a spring retainer, an O-ring, and a needle spring clip all centrally interconnected together by a connector to the movable seat and the movable needle, wherein the valve allows vapor to vent from the valve assembly by moving the movable needle downward in response to a changing fluid level in a fuel vapor separator.

12. A multi-function pressure relief valve for releasing excess vapor pressure and venting an internal chamber comprising:
   a barrel-shaped valve body having an inlet port and outlet port, each having a given inside diameter;
   a movable needle having a diameter to guidedly slide with the given inside diameter of the inlet port of the valve body, the movable needle connected to a float assembly to open and close the pressure relief valve for venting the internal chamber; and
   a movable sea t having a diameter to guidedly slid e wit in the given inside diameter of the outlet port and biased to engage the valve body and the movable needle to relieve excess pressure when pressure in the internal chamber exceeds a biasing force on the movable seat.

13. The multi-function pressure relief valve of claim 12 wherein the movable needle moves downward in response to a lowering fluid level in the internal chamber.

14. The multi-fixation pressure relief valve of claim 12 wherein the movable seat has an upper portion and a lower portion, a fuel passage connecting the upper portion and the lower portion to one another, the upper portion having a bore with a spring disposed therein, and the lower portion having a bore with the movable needle disposed therein.

15. The multi-function pressure relief valve of claim 12 wherein an upwardly extending arm connects a float to the movable needle such that the upwardly extending arm pivots as the float rises and falls with fluid level in the internal chamber.

16. The multi-function pressure relief valve of claim 15 wherein the upwardly extending arm pivots about a pivot pin.

17. The multi-function pressure relief valve of claim 12 wherein the movable needle has a polygonal cross-section to form a plurality of pathways for venting and relieving pressure therethrough.

18. A method for controlling vapor pressure in a fuel vapor separator using a single pressure relief valve having multiple functions, the method comprising the steps of:

(A) venting an internal chamber of the fuel vapor separator by disengaging a needle from a movable seat using a float attached to the needle;

(B) closing the single pressure relief valve when the float reaches a desired position to engage the needle to the movable seat;

(C) releasing excess vapor pressure through a plurality of pathways by moving the movable seat to disengage from the needle; and (D) positioning the pressure relief valve in a valve body that is constructed to slidably guide the needle and the movable seat in opposing ends thereof such that a portion of the needle is consistently in contact with the movable seat, the valve body being one portion of a housing in which the pressure relief valve assembly is mounted therein.

19. The method of claim 18 further comprising biasing the movable seat towards the needle with a desired pressure relief force.

20. A pressure relief valve assembly comprising:
means for venting an internal chamber through a plurality of pathways;
means for closing the pressure relief valve when a liquid level in the chamber reaches a desired level;
means for releasing vapor pressure; and
a valve body that is constructed to slidably guide the means for venting and the means for releasing vapor pressure in opposing ends thereof such that a portion of the means for venting is consistently in contact with the means for releasing vapor pressure, the valve body being one portion of a housing in which the pressure relief valve assembly is mounted therein.

21. The pressure relief valve assembly of claim 20 further comprising means for biasing a movable seat towards a needle with a desired pressure relief force.

22. A pressure relief valve comprising:
a valve body having an inlet at one end, an outlet at an opposing end, and a hollowed interior;
a movable seat slidably positioned in the hollowed interior of the valve body, the movable seat having a generally elongated, cylindrical-shape with a hollowed interior defining a relief passage with an inlet and an outlet at opposing ends, the inlet having a seat surface therein and the outlet having a biasing spring chamber to receive a bias-spring therein to urge the movable seat into the valve body; and
a movable needle slidably disposed within the inlet of the movable seat and engagable with the seat surface.

23. The pressure relief valve of claim 22 wherein the relief passage is opened and closed by slidable movement of either the movable seat or the movable needle.

24. The pressure relief valve of claim 22 further comprising a float connected to the movable needle to bias the movable needle toward the seat surface when a fluid in a fluid chamber reaches a given level.

25. The pressure relief valve of claim 22 wherein the valve body has a shoulder extending outwardly engagable with a mounting bracket to support the pressure relief valve.

* * * * *

UNITED STATES PATENT AND TRADEMARK OFFICE
CERTIFICATE OF CORRECTION

PATENT NO. : 6,422,255 B1
DATED : July 23, 2002
INVENTOR(S) : Hartke et al.

It is certified that error appears in the above-identified patent and that said Letters Patent is hereby corrected as shown below:

<u>Column 6,</u>
Line 57, delete "sea t" and substitute therefor -- seat --;
Line 57, delete "slid e" and substitute therefor -- slide --;
Line 57, delete "wit" and substitute therefor -- within --;
Line 58, delete "in";
Line 66, delete "multi-fixation" and substitute therefor -- multi-function --.

Signed and Sealed this

Third Day of December, 2002

JAMES E. ROGAN
*Director of the United States Patent and Trademark Office*